Patented Oct. 13, 1953

2,655,488

UNITED STATES PATENT OFFICE 2,655,488

INTERPOLYMER OF VINYLAROMATIC COMPOUND AND CONJUGATED OIL FATTY ACID

Eugene W. Kanning and Edward G. Hart, Cleveland, Ohio, assignors to The Arco Company, Cleveland, Ohio, a corporation of Ohio No Drawing. Application June 2, 1947,
Serial No. 751,961

27 Claims. (Cl. 260—23)

The present invention relates to a novel type of interpolymer, and is more particularly concerned with a certain interpolymer of a monovinylaromatic compound and a conjugated oil fatty acid, with a method for the production of the same, and with surface-coatings embodying the said polymerization product.

It has previously been proposed to incorporate styrene into a surface-coating according to various procedures. Such methods have, for example, included the polymerization of styrene in the presence of a drying oil, a resin, or a cellulosic film-forming material (U. S. Patent 1,975,959). However, the interpolymerization of styrene and a drying oil as the sole reactants is attended by serious difficulties which render the attainment of a polymer suitable for use as a surface coating a tedious, impractical, and often impossible proposition. Such difficulties are due to several considerations, most important of which is the tendency of the reaction mixture to gel, producing a polymeric material, frequently insoluble in common solvents and entirely unsuited for use in surface coatings. This has heretofore been obviated by reducing the proportion of styrene in the reaction mixture, with the result that, if a liquid product was produced, it closely resembled the drying oil itself. Other interpolymers of styrene and a drying oil have comprised major proportions of styrene and but a minor quantity of the drying oil, in a proportion of from about eleven parts to one to as high as even 98 parts to one. These polymers have been of little value as surface coatings, inasmuch as the former suffer from brittleness and poor adhesive qualities, while the latter polymers are solid plastic materials.

The non-gelled styrene-drying oil polymers, even if possible of preparation, are ordinarily further hindered in their application as surface-coatings by their cloudy appearance in common hydrocarbon solvents, and other usual defects of inhomogeneity resulting from failure of the polymer to go completely into solution in the solvent.

In summation, it may be stated that, if a non-gelled styrene-drying oil polymer can be produced, (1) the procedure required for such production is difficult or impossible to control, (2) the danger of gelation generally requires the styrene content of the polymer to be maintained at a minimum, below any desirable proportion in the interpolymer, or at a maximum, which renders the polymer excessively similar to polystyrene itself, and (3) any films produced from such interpolymers are usually unstable, due to incompatibility of the resinous product in common solvents, or are otherwise unadapted to the desired use. Thus, polymers of styrene and a drying oil are generally of limited value in the field of surface coatings.

It has now been found that a non-gelled interpolymer especially suitable for surface coatings and entirely compatible with the usually employed types of varnish solvents can be prepared from a specific combination of a monovinylaromatic compound and a specific type of drying oil fatty acid. The interpolymer thus produced has superior qualities as a paint or varnish film-forming resinous composition, producing a rapid-drying, glossy, tough paint or varnish film. The difficulties and disadvantages attendant upon the production of a styrene-drying oil polymer are not present in the process or product of the present invention, and, in many instances, liquid interpolymers of desirable characteristics are produced where, with the corresponding drying oil, e. g., with conjugated linseed oil, a liquid interpolymer having the requisite content of monovinylaromatic compound cannot be produced at all.

The product of the present invention, then, is an interpolymer of a monovinylaromatic compound with a conjugated oil fatty acid having specific characteristics, namely, an average degree of conjugation and double bond content at least equivalent to that of dehydrated castor oil fatty acids and less than that of beta-eleostearic acid. The monovinylaromatic compound is present in polymeric form in the interpolymer product in amount between about 18 and 56 per cent, preferably from 30 to 40 per cent, by weight of the product, being either in the form of its polymer or as a copolymer with the acid.

By "monovinylaromatic compound," as employed in this specification, is meant a compound containing at least the phenyl or naphthyl radical in combination with a vinyl group, and otherwise structurally similar to styrene. The phenyl group may contain substituents, as, for example, fluorine, chlorine, methoxy, hydroxy, methyl, trichloromethyl, or trifluoromethyl. As representative compounds included within the scope of "monovinylaromatic compound" may be mentioned styrene itself, para-methylstyrene, para-chlorostyrene, para-fluorostyrene, meta-chlorostyrene, meta-fluorostyrene, meta- and para-trichloromethylstyrene, meta- and para-trifluoro-methylstyrene, ortho- and meta-hydroxystyrene, methoxystyrenes, vinylnaphthalene, and the like. Substituents may also be present on the vinyl group, as in alpha-methylstyrene, but of course not in a manner such as to retard polymerization. Especially preferred monovinylaromatic compounds are the styrene derivatives, and particularly styrene itself, alpha-methylstyrene, and fluorostyrenes.

By "conjugated oil fatty acid having an average degree of conjugation and unsaturation at least equivalent to that of dehydrated castor oil fatty acids and less than that of beta-eleostearic acid" is meant an at least partially conjugated drying oil fatty acid or mixture of fatty acids having an average diene number and iodine number, the former being the experimental measure of conjugated unsaturation and the latter being the experimental measure of unsaturation, as determined according to specifications published by J. D. von Mikusch and Charles Frazier, Ind. Eng. Chem., Anal. Ed. 13, 782–789 (1941); 15, 109–113 (1943), within the range between the values for the two specific acids stated. Oil fatty acids having a greater or lesser double bond content than that prescribed above are unsuited for use, and, if the necessary conjugation is not present in the acid as introduced into the reaction zone, then heating or other reaction conditions must be sufficient to produce the same therein. Oil fatty acids are ordinarily processed by commercial suppliers according to various procedures which effect an average degree of conjugation and double bond content such as to render the processed acid suitable for employment in the method of the present invention. As representative oil fatty acids we may employ, for example, dehydrated castor oil fatty acids, conjugated linseed oil fatty acids, isomerized walnut oil fatty acids, conjugated soya oil fatty acids, or any other conjugated oil fatty acid having the prescribed characteristics. If the fatty acid itself is not readily available, it may be prepared from a drying oil by saponification and acidulation of separated acid salts. Any conjugated oil fatty acid or mixtures thereof may be employed as long as the average conjugation and unsaturation, as determined according to the previously designated specifications, is at least equivalent to that of dehydrated castor oil fatty (a minimum of approximately 133 and 33 Woburn) acids and less than that of beta-eleostearic acid (about 274 and 91 Woburn). The specifications of a typical oil fatty acid which may be employed in the procedure of the present invention are as follows:

| | |
|---|---|
| 1—Iodine No. | 143–153 (Wijs) |
| | 178–187 (Woburn) |
| 2—Color | 1–2 |
| 3—Acid No. | 197.5 to 199 |
| 4—Saponification No. | 198.5 to 199.5 |
| 5—Ester value | 0–1.5 |
| 6—Hexabromide value | 0–3 |
| 7—Wijs on ice for 3 minutes iodine value | 115–120 |
| 8—Conjugation (by difference) | 60–65 |
| | (62–73 Woburn) |
| 9—Titre value | 18–24 |
| 10—Spec. gravity | 0.9201 at 25° C. |
| 11—Viscosity | A+ to F (Gardner-Holdt scale at 77° F.) |

The method of the present invention essentially comprises the admixture of from 30 to 70 per cent by weight of the monovinylaromatic compound and from 70 to 30 per cent by weight of the conjugated oil fatty acid, preferably in the presence of an addition polymerization catalyst such as benzoyl peroxide, ditertiarybutyl peroxide, or oxygen. The reaction mixture is heated together at a polymerization temperature between about 100 and 180 degrees centigrade, preferably at about 130–160 degrees centigrade, for a period of time, sufficient effectively to convert at least about 60 per cent, and preferably between about 60 and 80 percent, of the monomeric monovinylaromatic compound to polymeric material, which is always short of the point at which gelatin occurs. The polymeric product preferably contains in excess of 30 per cent by weight of the polymeric monovinylaromatic compound.

The polymerization usually demands a time of from about two to eight hours at the preferred temperature given. The effective conversion of monomer to polymeric material may be determined by standard volatility procedure, the per cent of monomeric monovinylaromatic compound being retained after a specific period, e. g., one to two hours, at a specific temperature, e. g., 150 degrees centigrade, being indicative of the proportion in polymeric form. The monovinylaromatic compound in polymeric form may be present as its polymer or as a copolymer with the drying oil fatty acid, but may be considered merely as an interpolymer with the oil fatty acid.

The effective conversion of from 60 to 80 per cent of the 37–70 per cent by weight of the monovinylaromatic compound in the reaction mixture is productive of a non-gelled resinous interpolymer containing from 18 to 56 per cent by weight of polymeric monovinylaromatic compound in one form of polymer or another. The amount of monovinylaromatic compound in polymeric form in the resinous product is preferably always above 30 per cent. Any monomeric monovinylaromatic compound remaining may or may not be removed as desired, although removal according to the given procedure is preferred, as storage stability of the product is usually enhanced by elimination of the monomer. An especially preferred polymeric composition, prepared from a 50–50 weight mixture of monovinylaromatic compounds and conjugated oil fatty acid, contains from about 30 to 40 per cent of polymeric monovinylaromatic compound, exhibits exceptional clarity and good color in films formed therefrom, and possesses film properties comparable to a 50 to 60 per cent oil length soya-modified alkyd resin.

While the time required for the conversion of the desired amount (60–80 per cent) of monovinylaromatic compound is usually between about two and about eight hours when a temperature of 130 to 160 degrees centigrade is employed, reduction of the reaction temperature to about 100 degrees centigrade usually correspondingly increases the reaction period to about 10 to 12 hours. The reaction is under any circumstances continued until attainment of a reaction product having a viscosity in excess of about X on the Gardner-Holdt scale at 77 degrees Fahrenheit.

A preferred manner of conducting the interpolymerization is to admix the monomers at a temperature below about 130 degrees centigrade, and thereafter to raise the temperature slowly over a period of about 0.5 to 2 hours to about 180 degrees centigrade, at which time it may be rapidly elevated to between 200 and 250 degrees centigrade, preferably to about 220 degrees centigrade, and an inert gas, e. g., nitrogen or carbon dioxide, blown through the mixture of reaction products to remove unreacted monovinylaromatic compound monomer. If the preferred procedure given aboue is not employed, the mixture of reaction products may be gas-blown at a somewhat more elevated temperature after the reaction period has expired, or the monomer may be removed in any other suitable manner, if desired, such as by distillation.

The presehce of a solvent for the reaction is not required by the new process, as it is for most polymerizations of an oil with a monovinyl-aromatic compound, and such is preferably not employed. However, if desired, xylene, toluene, turpentine, terpenes and other hydrocarbons may be employed, with mineral spirits (petroleum hydrocarbons having a boiling range between about 150 and 200 degrees centigrade), or compounds of higher solvency, being preferred.

The polymerization procedure of the present invention is illustrated more fully by the following examples, which however, are not to be construed as limiting.

Example 1

Three hundred and twenty-five grams of conjugated linseed oil fatty acids, the iodine and diene values of which are described fully by J. D. von Mikusch and Charles Frazier, Ind. Eng. Chem., Anal. ed. 15, 109–113 (1943), under the description of Conjulin F. A., 315 grams of styrene, and 9.75 grams of benzoyl peroxide were introduced into a three-neck, one-liter flask provided with a mechanical stirrer, a reflux condenser, and a thermometer. The temperature of the reaction mixture was increased to between 130 and 160 degrees centigrade, which temperature was maintained until the reaction product had attained a viscosity of $Z_4$—$Z_5$ at 77 degrees Fahrenheit on the Gardner-Holdt scale. The time of heating required was about six hours.

The cooled product of this reaction showed no cloudiness, such as might indicate incompatability of some component in the reaction product. Films of this material, alone or in a solvent, rapidly air-dried to tough, glossy coatings, especially when metallic drier catalysts were added. These driers were metallic naphthenates in proportions such that cobalt, manganese and lead comprised respectively 0.01, 0.02, and 0.1 per cent of the resin composition. Films produced were far superior in air-drying properties, toughness, and general durability than any which could be produced from any constituent alone, or from conjugated linseed oil modified with interpolymerized styrene, and of a strength and brilliance which was far superior to blends of conjugated linseed oil fatty acids and a number of polymeric styrenes or alpha-methylstyrenes having a molecular weight between about 400 and 100,000. In addition, films produced from the above reaction products showed superior water- and alkali-resistant properties, in either air-dried or baked films.

Example 2

Three hundred and twenty-five grams of dehydrated castor oil fatty acids, 315 grams of styrene, and 9.75 grams of benzoyl peroxide were heated together for a period of eight hours at a temperature between about 130 and 160 degrees centigrade until the reaction product attained a viscosity in excess of Z (Gardner-Holdt scale at 77 degrees Fahrenheit), at which time the interpolymer contained in excess of 33 per cent styrene in the form of a polymer or a copolymer with the fatty acid, the remainder of the styrene being present as the monomer.

Films produced from this reaction product alone or in a solvent were rapid-drying, glossy, and exceedingly tough, whether in the form of paint or varnish films. The cooled reaction product showed no cloudiness with common aliphatic hydrocarbon solvents.

Example 3

The procedure of Example 1 is repeated, employing instead of styrene, 360 grams of alpha-methylstyrene. The product of the polymerization is very similar to that of Example 1, exhibiting surface-coating characteristics only slightly less desirable than those produced from styrene itself.

Example 4

The procedure of Example 1 is repeated, employing instead of styrene, 375 grams of para-fluorostyrene. The product of the reaction is very similar to that of Example 1, and possesses enhanced characteristics of hardness, durability, and resistance to water, alkali, and general exposure.

While the process hereinabove described is generally productive of a monovinylaromatic compound and conjugated drying oil fatty acid interpolymer having the previously-outlined desirable film-forming characteristics, a still further improvement in quality of the interpolymer can be effected by partial or complete esterification, with a polyhydric alcohol, of free carboxyl groups in this interpolymer.

This results, first, in a lower acid-value, which increases storage stability and allows more satisfactory use of the liquid resin with reactive pigments such as zinc oxide and iron blue. In addition, the esterified product is more advantageously resistant to exposure, water, and alkali than the non-esterified product. The present process makes facile the achievement of a reaction not feasible directly, and additionally allows for a considerable variation in the construction of synthetic esters having enhanced surface-coating qualities, especially over such reaction products as are possible of preparation from natural or synthetic esters of drying oil fatty acids and a monovinylaromatic compound.

As polyhydric alcohols for the esterification may be employed, for example, ethylene glycol, glycerol, penta-erythritol, polyallyl alcohol, mannitol, sorbitol, erythritol, trimethylol propane, and similar other compounds containing at least two and not more than six hydroxyl groups. The polyhydric alcohol employed usually contains in excess of two hydroxyl groups, as this allows for greater molecular weights of the synthetic esters. It is usually desirable to employ a quantity of the polyhydric alcohol in excess of the amount theoretically required to neutralize the free carboxyl groups in the primary interpolymer, and ordinarily sufficient of the alcohol to render the ratio of hydroxyl groups in the alcohol to carboxyl groups in the resinous polymer of the oil fatty acid and monovinylaromatic compound between about 1.1 to 2.0 to one, preferably between 1.1 and 1.6 to one. Otherwise expressed, the amount of polyhydric alcohol employed should be sufficient to render the acid value of the esterified polymer below about 40, and preferably below about 10. The esterification, of course, is always conducted to a point short of gelation of the resin, and may be checked, after attainment of a suitable acid number or viscosity, by dilution to a 50 per cent solution of non-volatile solids in a common solvent, such as mineral spirits or xylene.

The esterification may be accomplished by any conventional procedure therefor, but is advantageously conducted by heating together the oil fatty acid and monovinylaromatic compound reaction product with the selected polyhydric alcohol, preferably in the presence of an esterification catalyst, such as litharge or calcium stearate, at a resin-forming temperature, e. g., 100–250 degrees centigrade, usually between about 130 and 250 degrees centigrade, preferably at about 200–225 degrees centigrade, until an acid value of less than 40 has been attained in the esterified product. A current of carbon dioxide, nitrogen, or other inert gas may be passed through the mixture during the esterification to assist in removal of water, at a rate determined by foaming of the reaction mixture.

If desired, a solvent such as toluene, xylene, dipentene, or moderately low-boiling aliphatic hydrocarbons may also be incorporated into the esterification mixture, and the reaction conducted under temperature conditions regulated according to the maximum volume of reflux which can be controlled in the particular apparatus employed. The reaction container may, for example, be provided with a reflux condenser having a receiver whereby the mixed solvent-water condensate is collected and whereby the separated water may be withdrawn while the solvent is returned to the reaction container at a rate sufficient to replace the quantity removed by distillation. In such operation, carbon dioxide or other inert gas is not used, except perhaps as a protective blanket to inhibit oxidation. The fusion process first given is, however, much preferred, inasmuch as tougher and glossier films are produced from the products thereof than are ordinarily obtainable from products of the solvent process.

Several illustrative example of the esterification procedure are given below, but are in no way to be construed as limiting.

*Example 5*

Thirty grams of glycerine and 0.3 gram of litharge were mixed together with the reaction product of Example 1 in a three-neck, one-liter flask, provided with mechanical stirrer, thermometer, and an inlet tube for bubbling carbon dioxide through the reaction mixture. A temperature between about 210 and 225 degrees centigrade was employed for the reaction, while a current of carbon dioxide was passed slowly through the mixture to accelerate removal of water. The reaction was continued until the acid value of the mixture was reduced to less than 30.

Films produced from the esterified oil-fatty acid and styrene reaction product were found to have a durability far superior to any formed from any possible conjugated linseed oil and styrene polymer, wherein, of course, the proportion of styrene in polymeric form is far less than attainable by the present process. In addition, the reaction product was less reactive with basic pigments than the unesterified product from Example 1, and additionally superior in water- and alkali-resistance.

*Example 6*

The procedure of Example 5 was repeated, employing 35 grams of pentaerythritol instead of the glycerine. Films formed from this reaction product were found to possess even more desirable coating characteristics.

*Example 7*

The interpolymer of Example 3 is esterified according to the procedure of Example 6, and the product found to be only slightly less desirable than that produced from styrene itself.

*Example 8*

The interpolymer of Example 4 is esterified according to the procedure of Example 6. The product is very similar to that obtained from the employment of styrene itself, but is additionally superior in durability and resistance when in the form of films.

Coating compositions prepared from the interpolymer of the present invention, either esterified or unesterified, and a number of driers, pigments, and resins are especially suitable for employment as varnishes and baking enamels inasmuch as films produced therefrom are exceedingly tough and glossy, and exhibit excellent water- and alkali-resistance. Driers which may be advantageously incorporated with the interpolymer are metallic naphthenates, such as cobalt, manganese and lead. Among the resins which may be advantageously employed in combination with the interpolymer of the present invention, either esterified or unesterified, to allow production of a surface coating of superior characteristics, an oil-soluble phenol-aldehyde resin, pentaerythritol esters of rosin, ester gum, and, in general, other hard varnish resins are desirable. Such a resin is preferably employed in a minor proportion, e. g., up to about 30 per cent by weight of the mixture.

For the preparation of surface coatings from the interpolymer of the present invention, the resin may be diluted to any desirable extent with a common varnish solvent, mineral spirits and xylene being somewhat preferred. The concentration should usually be between about 50 and 60 per cent of non-volatile solids, and films produced from such solutions have been found especially desirable. The exact concentration employed, however, is not significant, as it has been found that variation of the solids content over a reasonable range does not materially affect the superior quality of the films.

Various modifications may be made in the invention without departing from the spirit or scope thereof, and it is to be understood that we limit ourselves only as defined in the appended claims.

We claim:

1. The product of claim 10, wherein the conjugated oil fatty acid is a conjugated linseed oil fatty acid (2).

2. The product of claim 10, wherein the monovinylaromatic compound (1) is styrene.

3. The process of claim 11, wherein the monovinylaromatic compound (1) is styrene.

4. The process of claim 11, wherein the conjugated oil fatty acid (2) is a conjugated linseed oil fatty acid.

5. The product of claim 10, wherein the monovinylaromatic compound (1) is styrene and the conjugated oil fatty acid (2) is conjugated linseed oil fatty acid.

6. The product of claim 10, wherein the monovinylaromatic compound (1) is styrene, the conjugated oil fatty acid (2) is conjugated linseed oil fatty acid, and wherein free carboxyl groups of the interpolymer are esterified with a polyhydric alcohol, containing hydroxyl groups as sole functional groups and not more than six hydroxyl groups per molecule, to an acid value of less than 40.

7. The process of claim 11, wherein the interpolymerization is conducted in the presence of an addition polymerization catalyst selected from the group consisting of peroxygen addition polymerization catalysts and oxygen.

8. The process of claim 11, wherein the monovinylaromatic compound (1) is styrene and wherein the conjugated oil fatty acid (2) is conjugated linseed oil fatty acid.

9. The process of claim 11, wherein the monovinylaromatic compound (1) is styrene, the conjugated oil fatty acid (2) is conjugated linseed oil fatty acid, and wherein free carboxyl groups of the interpolymer are thereafter esterified to an acid value of less than 40 by heating at a temperature between 100 and 250 degrees centigrade together with a polyhydric alcohol, containing no functional groups other than hydroxyl groups and not more than six hydroxyl groups per molecule.

10. A non-gelled resinous interpolymer produced by heating, at a temperature between about 100 degrees and 250 degrees centigrade, a starting polymerization mixture consisting essentially of (1) from about 70 to 30 percent by weight of a monovinylaromatic compound selected from the group consisting of styrene, fluorostyrene, chlorostyrene, methoxystyrene, hydroxystyrene, methylstyrene, trichloromethylstyrene, trifluoromethylstyrene, and alpha-methylstyrene, and (2) from about 30 to 70 percent by weight of a conjugated oil fatty acid selected from the group consisting of conjugated linseed oil fatty acids and dehydrated castor oil fatty acids, said monovinylaromatic compound in polymeric form comprising from about 30 to 56 percent by weight in said polymeric product.

11. A process for the production of an ungelled resinous interpolymer which includes the step of interpolymerizing a starting polymerization mixture consisting essentially of (1) a monovinylaromatic compound selected from the group consisting of styrene, chlorostyrene, fluorostyrene, methoxystyrene, hydroxystyrene, methylstyrene trichloromethylstyrene, trifluoromethylstyrene, and alpha-methylstyrene and (2) a conjugated oil fatty acid selected from the group consisting of conjugated linseed oil fatty acids and dehydrated castor oil fatty acids, in a reaction ratio of from about 30 to 70 percent by weight of the monovinylaromatic compound (1) to about 70 to 30 percent by weight of the conjugated oil fatty acid (2), by heating the polymerization mixture at a temperature between about 100 and 250 degrees centigrade until conversion of above 60 percent of the monovinylaromatic compound (1) to non-gelled resinous product, and until the monovinylaromatic compound (1) is present in the polymeric product in polymeric form in amount of at least 30 percent by weight of the interpolymer.

12. The process according to claim 11, wherein the reaction temperature is between about 100 and 180 degrees centigrade.

13. A non-gelled resinous interpolymer produced by heating, at a temperature between about 100 degrees and 250 degrees centigrade, a starting polymerization mixture consisting essentially of (1) from about 70 to 30 percent by weight of a monovinylaromatic compound selected from the group consisting of styrene, fluorostyrene, chlorostyrene, methoxystyrene, hydroxystyrene, methylstyrene, trichloromethylstyrene, trifluoromethylstyrene, and alpha-methylstyrene, and (2) from about 30 to 70 percent by weight of a conjugated oil fatty acid having an average degree of unsaturation, as determined by Woburn iodine number between about 133 and 274, and as determined by Woburn diene number between about 33 and 91, until said monovinylaromatic compound in polymeric form comprises from about 30 to 56 percent by weight in said monovinylaromatic compound and oil fatty acid polymeric product, and thereafter esterifying free carboxyl groups of the interpolymer with a polyhydric alcohol, containing hydroxyl groups as sole functional groups and not more than six hydroxyl groups per molecule, to an acid value of less than forty, by heating the monovinylaromatic compound and oil fatty acid interpolymer together with the polyhydric alcohol at a resin-forming temperature between about 100 and 250 degrees centigrade.

14. A process for the production of an ungelled resinous interpolymer which includes the step of interpolymerizing a starting polymerization mixture consisting essentially of (1) a monovinylaromatic compound selected from the group consisting of styrene, fluorostyrene, chlorostyrene, methoxystyrene, hydroxystyrene, methylstyrene, trichloromethylstyrene, trifluoromethylstyrene, and alpha-methylstyrene, and (2) a conjugated oil fatty acid having an average degree of unsaturation, as determined by Woburn iodine number between about 133 and 274, and as determined by Woburn diene number between about 33 and 91, in a reaction ratio of from about 30 to 70 percent by weight of the monovinylaromatic compound (1) to about 70 to 30 percent by weight of the conjugated oil fatty acid (2) by heating the polymerization mixture at a temperature between about 100 and 250 degrees centigrade until conversion of above about 60 percent of the monovinylaromatic compound (1) to non-gelled resinous product and until the monovinylaromatic compound (1) is present in the polymeric product in polymeric form in amount of at least 30 percent by weight of the interpolymer, and thereafter esterifying free carboxyl groups of the interpolymer to an acid value of less than forty with a polyhydric alcohol, containing hydroxyl groups as sole functional groups and not more than six hydroxyl groups per molecule, by heating the monovinylaromatic compound and oil fatty acid interpolymer together with the polyhydric alcohol at a resin-forming temperature between about 100 and 250 degrees centigrade.

15. The product of claim 13, wherein the reaction temperature of the polymerization step is between about 100 and 180 degrees centigrade.

16. The process of claim 14, wherein the reaction temperature of the polymerization step is between about 100 and 180 degrees centigrade.

17. The process of claim 14, wherein the polymerization step is conducted in the presence of an addition polymerization catalyst selected from the group consisting of peroxygen addition catalysts and oxygen.

18. The product of claim 10, wherein the conjugated oil fatty acid (2) is dehydrated castor oil fatty acid.

19. The process of claim 11, wherein the conjugated oil fatty acid (2) is dehydrated castor oil fatty acid.

20. The product of claim 10, wherein the monovinylaromatic compound (1) is styrene and the conjugated oil fatty acid (2) is a dehydrated castor oil fatty acid.

21. The process of claim 11, wherein the monovinylaromatic compound (1) is styrene and the conjugated oil fatty acid (2) is a dehydrated castor oil fatty acid.

22. A process for the production of an ungelled resinous reaction product which comprises heating under reflux a mixture consisting essentially of styrene and a conjugated drying oil fatty acid having an average degree of conjugation and unsaturation at least equivalent to that of dehydrated castor oil fatty acids and less than that of beta-eleostearic acid until the reaction product contains at least 35 percent by weight of styrene.

23. A process for the production of an ungelled resinous reaction product which comprises: heating under reflux a mixture consisting essentially of styrene and dehydrated castor oil fatty acids until the reaction product contains at least 35 percent by weight of styrene and thereafter esterifying the reaction product with a polyhydric alcohol.

24. A process for the production of an ungelled resinous interpolymer which comprises heating under reflux a mixture consisting essentially of (1) a monovinylaromatic compound selected from the group consisting of styrene, fluorostyrene, chlorostyrene, methoxystyrene, hydroxystyrene, methylstyrene, trichloromethylstyrene, trifluoromethylstyrene, and alpha-methylstyrene, and (2) a conjugated drying oil fatty acid having an average degree of conjugation and unsaturation at least equivalent to that of dehydrated castor oil fatty acids and less than that of beta-eleostearic acid until the interpolymer contains at least 35 percent by weight of said monovinylaromatic compound.

25. A non-gelled resinous interpolymer produced by heating under reflux a mixture consisting essentially of (1) a monovinylaromatic compound selected from the group consisting of styrene, fluorostyrene, chlorostyrene, methoxystyrene, hydroxystyrene, methylstyrene, trichloromethylstyrene, trifluoromethylstyrene and alpha-methylstyrene, and (2) a conjugated oil fatty acid having an average degree of conjugation and unsaturation at least equivalent to that of dehydrated castor oil fatty acids and less than that of beta-eleostearic acid until the interpolymer contains at least 35 percent by weight of said monovinylaromatic compound.

26. A process for the production of an ungelled resinous interpolymer which comprises: heating under reflux a mixture consisting essentially of (1) a monovinylaromatic compound selected from the group consisting of styrene, fluorostyrene, chlorostyrene, methoxystyrene, hydroxystyrene, methylstyrene, trichloromethylstyrene, trifluoromethylstyrene, and alpha-methylstyrene, and (2) a conjugated oil fatty acid having an average degree of unsaturation, as determined by Woburn iodine number between about 133 and 274, and as determined by Woburn diene number between about 33 and 91, until the interpolymer contains at least 35 percent by weight of said monovinylaromatic compound and thereafter esterifying the interpolymer with a polyhydric alcohol.

27. A non-gelled resinous interpolymer produced by heating under reflux a mixture consisting essentially of (1) a monovinylaromatic compound selected from the group consisting of styrene, fluorostyrene, chlorostyrene, methoxystyrene, hydroxystyrene, methylstyrene, trichloromethylstyrene, trifluoromethylstyrene, and alpha-methylstyrene, and (2) a conjugated oil fatty acid having an average degree of unsaturation, as determined by Woburn iodine number between about 133 and 274, and as determined by Woburn diene number between about 33 to 91, until the interpolymer contains at least 35 percent by weight of said monovinylaromatic compound and thereafter esterifying the interpolymer with a polyhydric alcohol.

EUGENE W. KANNING.
EDWARD G. HART.

References Cited in the file of this patent

UNITED STATES PATENTS

| Number | Name | Date |
| --- | --- | --- |
| 2,190,915 | Bass et al. | Feb. 20, 1940 |
| 2,322,837 | Ellis | June 29, 1943 |
| 2,392,710 | Wakeford | Jan. 8, 1946 |
| 2,395,504 | Rubens | Feb. 26, 1946 |

OTHER REFERENCES von Mikusch et al., Ind. Eng. Chem., Anal. Ed. vol. 15, pp. 109–113 (1943).

Certificate of Correction

Patent No. 2,655,488                                                October 13, 1953

Eugene W. Kanning et al.

It is hereby certified that error appears in the printed specification of the above numbered patent requiring correction as follows:

Column 4, line 11, for "gelatin" read *gelation*; line 30, for "37–70" read *30–70*; line 46, for "compounds" read *compound*; column 5, line 2, for "aboue" read *above*; column 7, line 42, for "example" read *examples*; column 8, line 59, strike out "(2)" and insert the same after "fatty acid" and before "is" in line 58, same column;

and that the said Letters Patent should be read as corrected above, so that the same may conform to the record of the case in the Patent Office.

Signed and sealed this 27th day of April, A. D. 1954.

[SEAL]

ARTHUR W. CROCKER,
*Assistant Commissioner of Patents.*